Oct. 22, 1968  J. BEMROSE  3,406,777
METHOD OF SEISMIC PROSPECTING
Filed July 20, 1966  7 Sheets-Sheet 1
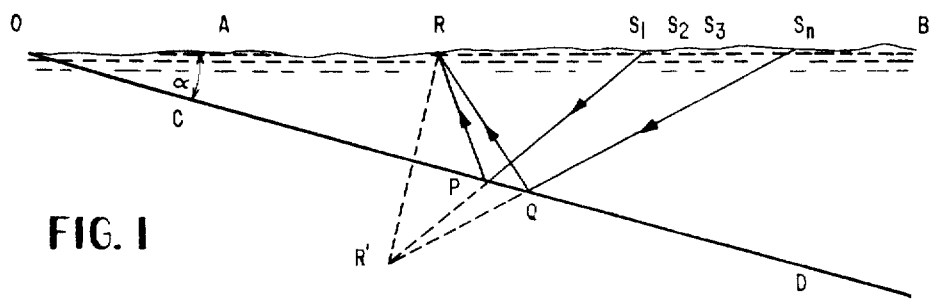
FIG. 1
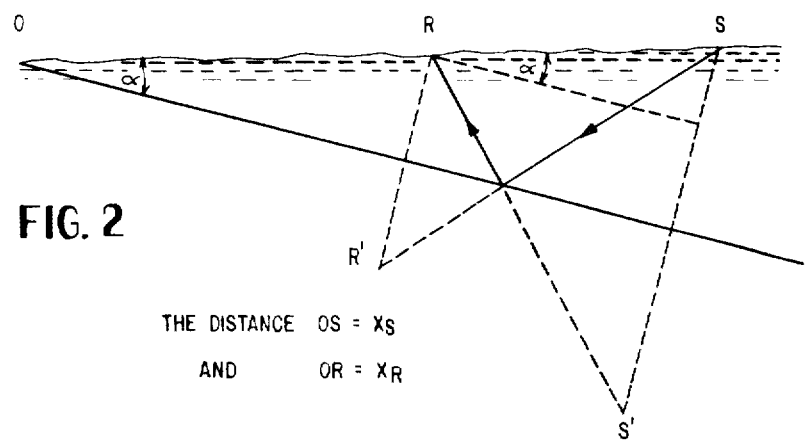
FIG. 2
THE DISTANCE  OS = $x_S$
AND  OR = $x_R$
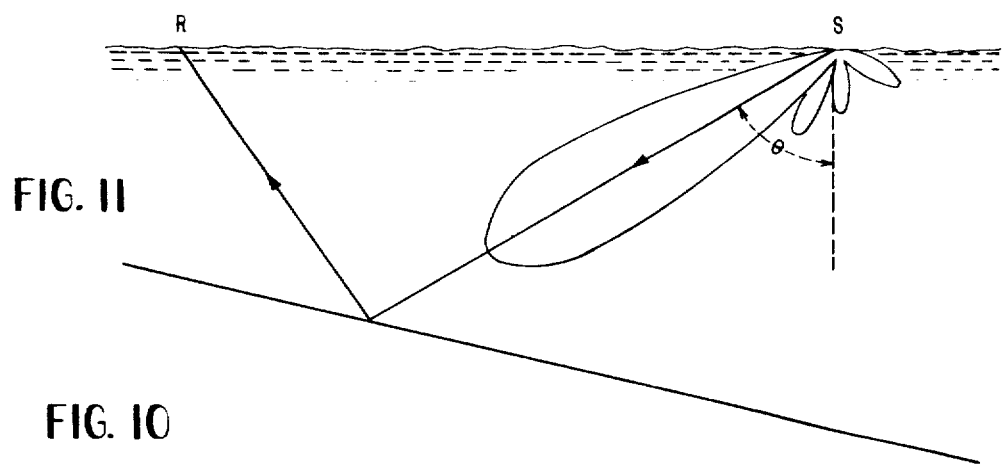
FIG. 11
FIG. 10
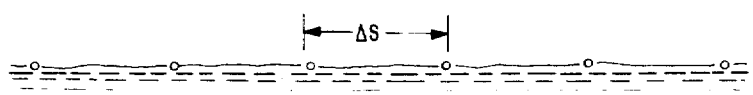
INVENTOR
JOHN BEMROSE
BY *McLean, Morton & Boustead*
ATTORNEYS.

INVENTOR
JOHN BEMROSE

Oct. 22, 1968    J. BEMROSE    3,406,777
METHOD OF SEISMIC PROSPECTING
Filed July 20, 1966    7 Sheets-Sheet 5

INVENTOR
JOHN BEMROSE

BY McLean, Morton & Boustead

ATTORNEYS

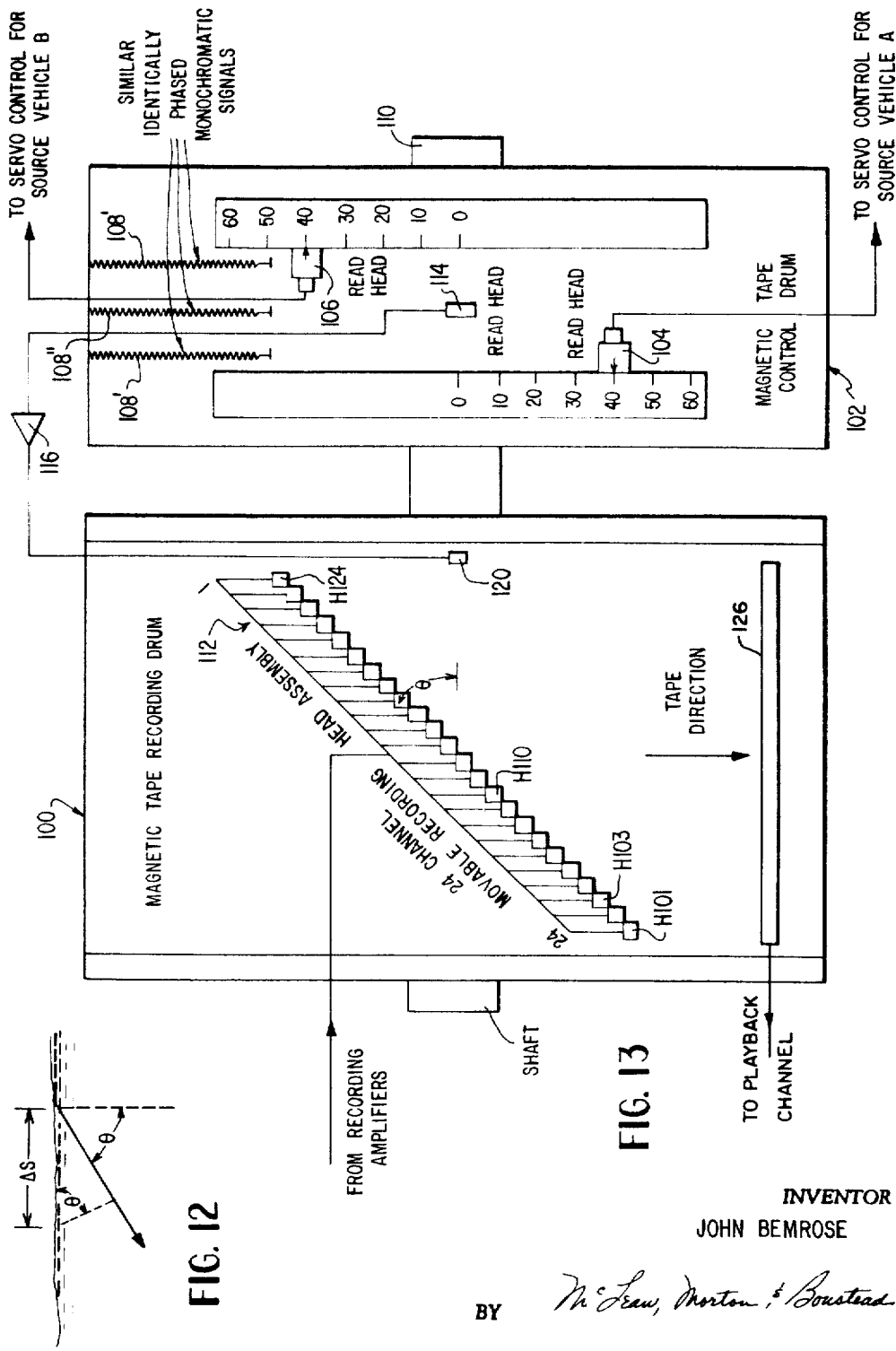

Oct. 22, 1968   J. BEMROSE   3,406,777
METHOD OF SEISMIC PROSPECTING
Filed July 20, 1966                    7 Sheets-Sheet 7

INVENTOR
JOHN BEMROSE

BY

ATTORNEYS

United States Patent Office 3,406,777
Patented Oct. 22, 1968

3,406,777
METHOD OF SEISMIC PROSPECTING
John Bemrose, Tulsa, Okla., assignor, by mesne assignments, to Sinclair Research, Inc., New York, N.Y., a corporation of Delaware
Filed July 20, 1966, Ser. No. 566,582
2 Claims. (Cl. 181—.5)

ABSTRACT OF THE DISCLOSURE

A method of seismic reflection surveying in which a plurality of separate impulsive compressional waves are injected into the ground from a source of such energy for which the energy level, the wave form and the moment of injection with respect to a fixed time origin are repeatable. The energy reflected from a reflection horizon of interest is recorded. Some of the energy is injected at a predetermined leading time and some at a predetermined lagging time with respect to the fixed time origin, and the reflected waves are separately recorded. The recorded waves are summed to augment the reflection signals while attenuating surface waves.

---

This invention pertains to compositing of seismic signals generated by ground-coupled energy sources, and more particularly, to time delay compositing accomplished by employing energy sources having the properties of repeatability of the wave form and energy level of the seismic impulse injected into the ground, and repeatability, advancement or retardation of the moment of injection of the impulse with respect to a fixed time origin, so that the direction or tilt of the energy can be controlled.

In general, with seismic reflection surveying employing energy sources having time repeatability characteristics which inject continuous or semi-continuous signals of any form whatsoever, two types of wave energy are generated including waves that travel downward in a near vertical direction and undergo reflection by geologic layers and so return in the near vertical direction to the surface and waves which travel outward from the source in an approximately horizontal direction. As recognized heretofore, these horizontal waves interfere with the reflected waves making recognition of the reflected waves difficult or impossible. To alleviate this problem, in the normal practice of reflection shooting with surface seismic energy sources the source location, i.e., the location of the energy source, is moved a small distance so that the phase of the surface waves arriving at a fixed receiver location changes, whereas the phase or the reflected waves arriving at the same location hardly changes at all. Therefore, with individual recordings of the wave arrivals made on magnetic tape from each of several source locations and added together, the reflected waves, being in nearly the same phase, will be augmented, while the surface waves, being mostly out of phase, will be attenuated, so that with proper spacing of the many source locations the wanted reflection waves can be easily discerned in the background of attenuated surface wave energy. However, when the geologic horizons giving rise to the reflected waves are inclined, or when the shooting distance is large, the distribution of locations of the energy source normally required for efficient attenuation of the surface waves is generally aerially too large to permit the reflected waves to arrive in nearly the same phase at a particular receiving station for each of the several source locations. Consequently, the reflected waves are mostly out of phase and the processes of compositing or adding the separate seismic recordings attenuate both the surface waves and the wanted reflected waves.

In accordance with this invention, a system has, however, now been developed whereby with the introduction of suitable time advances (leads) or time delays (lags) into the recording system for each of the wave source locations, the reflected waves from a particular reflection horizon can be brought into almost perfect phase for each source location so that the process of compositing now augments the reflected waves and attenuates the surface waves. This is accomplished by controlling the direction or tilt of the energy injected into the ground and/or received after reflection by adjusting the lead and lag times so that the seismic waves injected from the separate locations arrive at the recording station in the same time after reflection and in phase. The separate recordings of the reflected waves can now be composited, e.g. summed or integrated, with no adjustments necessary due to their in-phase arrival. Such a system for introducing suitable advance and retardation time into the surveying is an object of this invention. In general this time delay compositing is accomplished by employing energy sources having the properties of repeatability of the wave form and energy level of the seismic impulse injected into the ground, and repeatability of the moment of injection of the impulse with respect to a fixed time origin, so that, when desired, the moment of injection can be advanced or delayed in time by any desired amount with respect to this fixed reference time or origin. The actual lead and lag times vary with the particular reflection horizon of geologic interest and are a function of the distance between the energy source and the receiving-recording system, the depth of the horizon, the velocity of the energy along the path traversed, and the altitude or dip of the horizon of geologic interest. Lead and lag times of from zero to thirty or more milliseconds are typical and provide angles of tilt of zero to 45 degrees, or more. In general, the more the angle of tilt, the more the deeper penetrating waves deteriorate so that high angles of tilt are desired when reflections from shallow horizons are to be emphasized. The angle of dip is also a consideration in selecting the angle of tilt.

Copending Kilmer applications Ser. No. 187,111 filed Apr. 12, 1962, now U.S. Patent No. 3,235,027 issued Feb. 15, 1966 and Ser. No. 314,230, filed Oct. 7, 1963, now U.S. Patent No. 3,314,497 issued Apr. 18, 1967, describe energy sources for producing seismic impulses which are particularly suitable for use in the system of this invention. These devices can be repeatedly used following a regular cycle of pulsed or sequential firing at equal or variable time intervals. In general, the devices described in said copending applications use a gas explosion confined in a closed, vertically expansible chamber to impart a compressive impulse and initiate a seismic wave. The chamber which contains the gas explosion has a bottom pressure plate of considerable area which transmits the force of the explosion to the surface to be seismically explored. Surmounting the expandible chamber is a dead weight of substantial mass. The explosion or violent combustion of a gas mixture in the chamber produces a shock wave which ordinarily would be transmitted equally in all directions, however, the great inertia of the dead weight surmounting the chamber directs the major portion of the force of the explosion downwardly against the pressure plate, thus causing a substantial movement of the plate, which, as mentioned, is of considerable area. The force of the explosion thus quickly applies compressive stress at the interface beneath the chamber to initiate a seismic wave. The frequency of detonation within the expansible chamber is arranged, in coordination with the size of the pressure plate, to give sound pulses of the desired frequency. The combustion gas mixture usually includes air or oxygen mixed with a combustible gas such as propane, propylene, ethylene, acetylene, etc.

Energy sources such as known in the art for applying continuous monochromatic sound waves into the ground can also be used in this invention. There are many kinds of vibratory systems available commercially which may be operated with a program control and used, when suitably coupled with the ground, to inject compressional waves of constant amplitude and desired frequency into the ground. The moment of commencement and direction of the first motion from rest is under control so that the system has time and motion repeatability.

For a discussion of the background theory, a more complete understanding of the present invention, and for further objects and advantages thereof, reference may now be had to the following description taken in conjunction with the accompanying drawings in which:

FIGURES 1–3 show representative reflection signals from an inclined reflector plan and illustrate the present invention;

Figure 14:
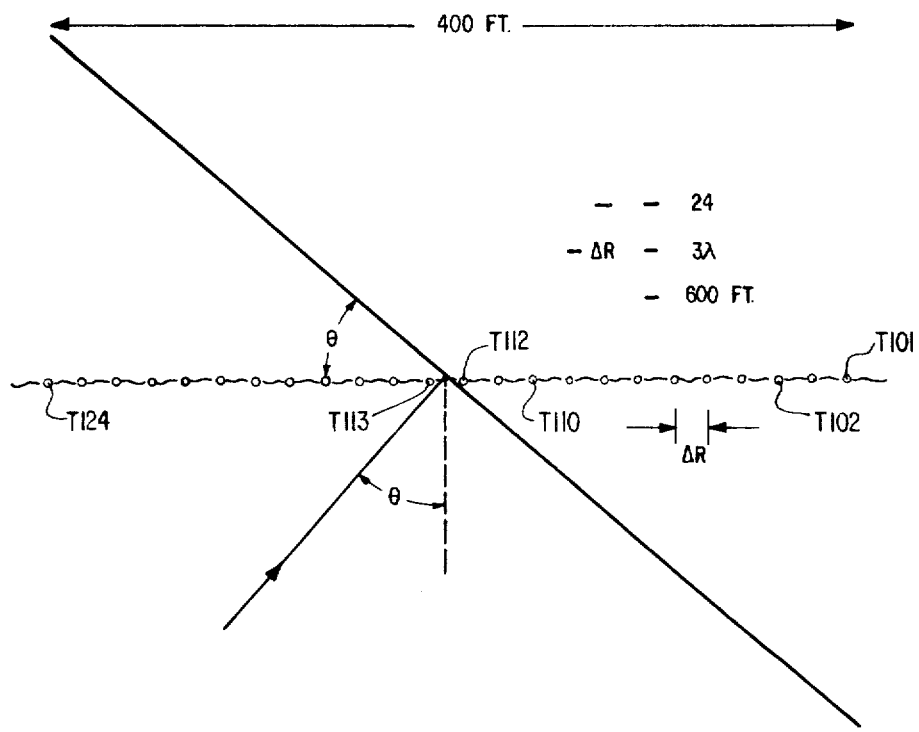

FIGURES 8–12 illustrate using a linear array of seismic sources on the ground surface turning of the direction of maximum sensitivity to reception from the vertical to an optimum direction most suited to the reception of reflected energy; and, FIGURES 13 and 14 illustrate schematically an arrangement for controlling two seismic sources capable of injecting a continuous monochromatic signal into the ground.

Referring now to FIGURE 1, $S_1, S_2, S_3 \ldots S_n$ are successive source locations on the plane A–B which represents the surface of the ground and R is the location of a receiving transducer in the same plane A–B and $R^1$ is the image of R in an inclined reflector plane C–D where the points $S_1, S_2 \ldots S_n$, R and $R^1$ are in a vertical plane. When $S_1R^1$ and $S_nR^1$ are joined to cut the reflector plane C–D at P and Q respectively, then by the law of reflection, energy from the source location $S_1$ is reflected at P and arrives at R. Similarly, energy from the source location $S_n$ is reflected at Q and arrives at R at a time later than the arrival from the source location $S_1$. When the energy arriving at R is recorded separately for each of the source locations $S_1, S_2, \ldots S_n$ in this order and with a suitable time advance that increases in the same order, the reflection time arrivals at R for each source location can be made the same, and, by adding the separate recordings the reflection events will be augmented in amplitude ($n$) times and the surface waves originating at each of the several source locations will arrive at R with various phase relationships which, on summation, will cause the waves to cancel for the most part.

The advancement or retardation in time of the moment of injection of the seismic wave energy into the ground with respect to a fixed time reference or origin is determined from the shooting geometry and expected angles of dip of the reflecting horizons. Thus, in FIGURE 2, which is similar to FIGURE 1, it is evident that the reflection time $T_R$ over the path S to R on the surface of the ground is the same as that over the path $SR^1$. With a distance $X_S$ from the outcrop O of the reflector in the ground surface to the source location S and a distance $X_R$ from the outcrop O of the reflector in the ground surface to the receiver location R, the reflector being inclined to the horizontal at an angle $\alpha$, if V is the constant velocity in the subsurface medium, it can be deduced that $$V^2T_R^2 = [2X_S \sin \alpha - (X_S - X_R) \sin \alpha]^2 + (X_S - X_R)^2 \cos 2\alpha = X_S^2 + X_R^2 - 2X_SX_R \cos 2\alpha \quad (1)$$

for the case where the energy travels from the source to the receiver in the up-dip direction that is, where $X_S$ is greater than $X_R$. It is evident that by interchanging $X_S$ and $X_R$ for the case where the energy travels down-dip Equation 1 remains unchanged except that now, of course $X_R$ is greater than $X_S$.

Differentiating Equation 1 with respect to the source distance $X_S$ and replacing the derivatives by $\Delta T$ and $\Delta X_S$ Equation 2 is obtained:

$$\Delta T_U = \frac{1}{V^2 T_R}[X_S - X_R \cos 2\alpha]\Delta X_S \text{ where } X_S > X_R \quad (2)$$

$\Delta T_U$ being the variation in the up-dip reflection time $T_R$ for small variations $\Delta X_S$ in the source distance. This variation is always positive, that is, an increase in the distance $X_S$ is accompanied by an increase in the travel time $T_R$. It is also evident that the variation is a maximum when the inclination of the reflection of the reflector is 45°. Also we obtain for the down-dip case of time variation with distance:

$$\Delta T_D = \frac{1}{V^2 T_R}[X_S - X_R \cos 2\alpha]\Delta X_S \text{ where}: X_S < X_R \quad (3)$$

This variation in time with angle of dip is at first negative and then positive, the zero value occurring when $$\cos 2\alpha = \frac{X_S}{X_R}$$

Figure 3:
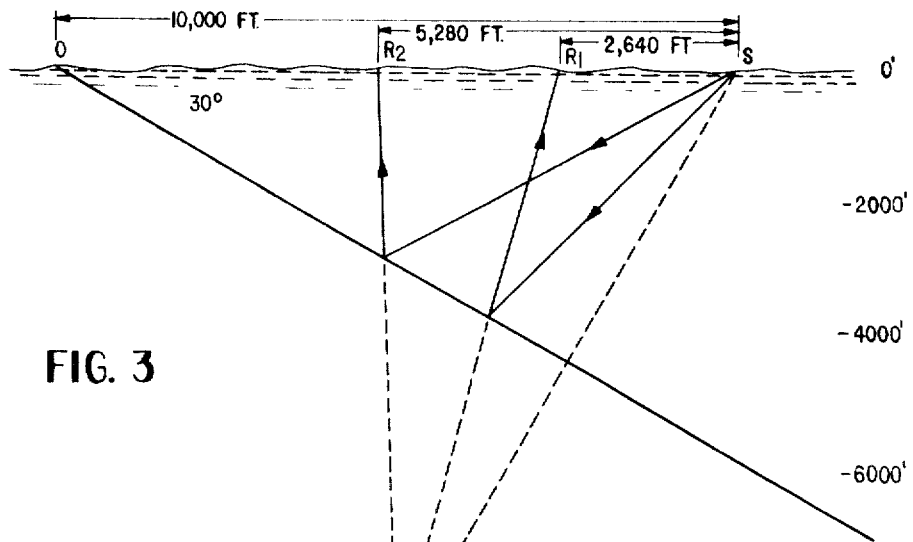

A specific illustration of the methods for determination of the time variation is shown by FIGURE 3 where two receiving transducers $R_1$ and $R_2$ are arranged at distances 2640 feet and 5280 feet from a reflector inclined at 30° to the horizontal, the source location being at a distance of 10,000 feet from the outcrop. Thus, we have $$X_S = 10,000'; \ X_{R1} = 7,360'; \ X_{R2} = 4,720'; \text{ and } \alpha = 30°$$

These distances are such as might be encountered in a reflection survey and for this angle of dip, the depth of the reflector at S along a normal is 5,000'. With a velocity of 10,000' per second for the medium, the reflection arrival time $T_{R1}$ at the transducer $R_1$ is obtained from Equation 1 as, $T_{R1} = 0.8976$ sec., and the respective time $T_{R2}$ at the transducer $R_2$ as, $T_{R2} = 0.8665$ sec., these being the up-dip reflection times for $X_S > X_{R1} > X_{R2}$. From Equation 2 we may now write $\Delta T_{U2}$ equals $7.0410 \times 10^{-5}$ sec./ft., for the time variation at the transducer $R_1$ and $\Delta T_{U2}$ equals $8.8173 \times 10^{-5}$ sec./ft., for the variation at the transducer $R_2$. The values are nearly the same and the time variation for the spread of transducers between $R_1$ and $R_2$ may therefore be taken as the means of these two values, that is, $\Delta T_U = 7.9291 \times 10^{-5}$ sec./ft. A source pattern extending over a distance of 400' in the up-dip shooting direction will therefore have a time variation over the transducers $R_1$ to $R_2$ of 400 times $7.9291 \times 10^{-5}$ seconds or 31.72 milliseconds which is nearly equal to the period of one complete cycle of a reflection event at a frequency of 30 c.p.s. At half this distance, the time variation will be about half a period at this frequency so that, for sources at this distance the processes of compositing will cancel the desired reflected waves. The necessity for compositing for this time variation brought about by variation in the source location such as in the instant invention is now apparent.

Figure 4:
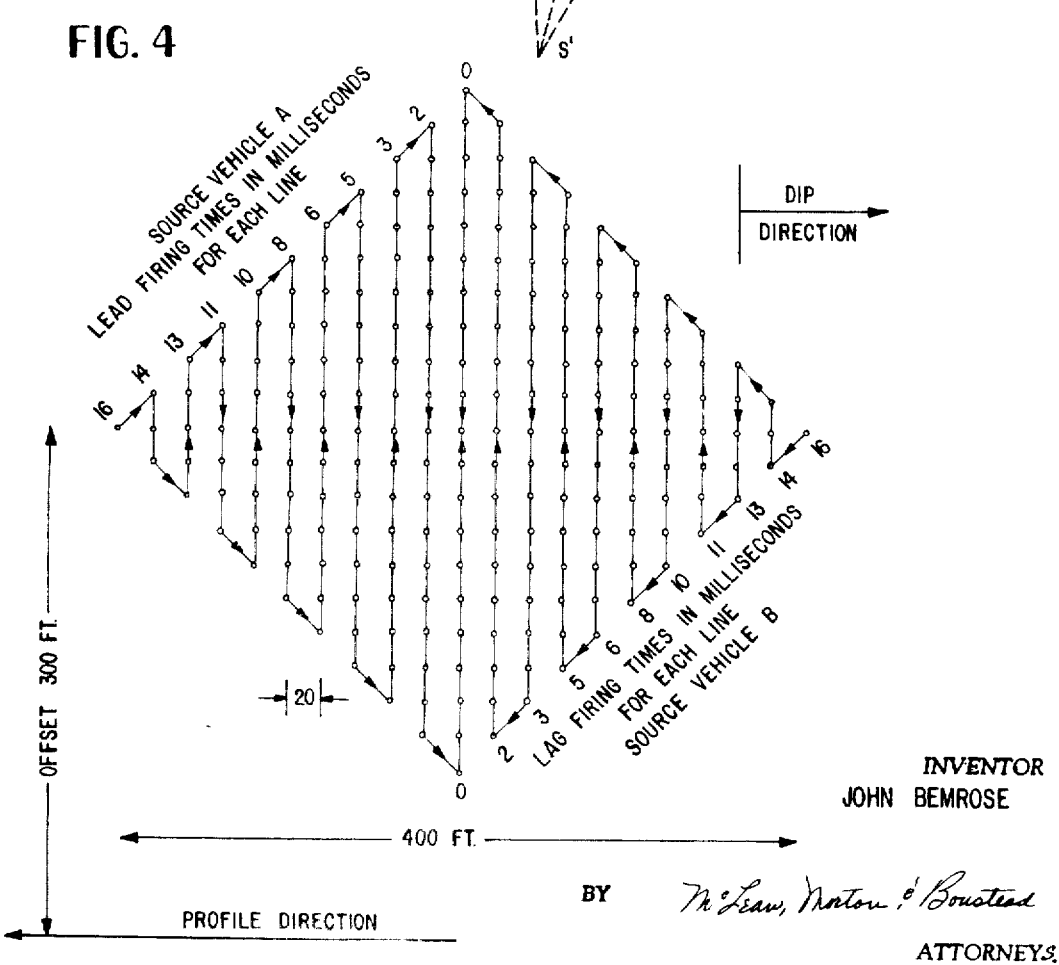
FIGURE 4 illustrates a two-source lead-lag location pattern for phase compositing of reflection signals in accordance with this invention.

FIGURE 4 illustrates a typical pattern of source locations, the locations being spaced 20 feet apart forming a square with a diagonal of 400 feet parallel to the shooting direction. Surface waves arriving at the receiving transducers from each of these source locations separately have a variety of phase relationships which, when composited into a single wave train for each transducer location are largely attenuated. From the foregoing, seismic energy originating from a source location at one end of the 400′ diagonal of the pattern will have a time difference after reflection of about 32 milliseconds (ms.) from that arriving from a source at the other end of the diagonal. Or, with respect to the center of the pattern the reflected energy from one end will be about 16 ms. too early while that from the other end will be about 16 ms. too late. The pattern is made up of lines nearly at right angles to the shooting direction so that the reflection energy will arrive at any particular transducer in the array $R_1$ to $R_2$ at equal times for all source locations on the central line of the source pattern and at a slightly longer time for all source locations on the next line spaced 20 feet to the right. This time difference from Equation 3 is $20 \times 7.929 \times 10^{-5}$ seconds or 2 milliseconds. Similarly, for all source locations on the next line spaced 20 feet to the right the time difference is about 3 milliseconds and so on for all the lines to the right. In the same way, the arrival times will be earlier for all the lines to the left of the center. FIGURE 4 displays the time variations for each line of the source locations, those to the right of center being the amount by which the arrival time has to be delayed or lagged while those to the left being the amount the arrival times have to be increased or to lead.

In accordance with this invention, for reasons of economy and efficiency, energy can be derived from two vehicular sources operating from different locations in the source patterns in order that the source locations can be occupied in half the time it takes for one source vehicle to perform the operation; however, the use of a single source in no way changes the procedure. Seismic energy will be injected into the ground independently by each vehicle equipped with a similar ground-coupled energy source such as discussed above. On receipt of a suitable separate coded signal transmitted from the recording equipment by radio it is possible for each of the sources to inject wave energy at the same time, or the moment of injection by one source can be delayed with respect to the other by any desired amount, the maximum delay being generally of the order of 100 milliseconds, by devices calibrated in milliseconds. The signal to inject energy is transmitted by radio from the recording equipment to each of the two sources on two separate radio frequency bands or on the same radio frequency bands by separately coded signals. The signals will cause the source devices to fire and so inject a seismic impulse into the ground, or it will cause a servo system to operate for the injection of a continuous wave train of some particular shape under a program control. Seismograms, i.e., records of reflected waves, have been satisfactorily obtained by introducing lead-lag times into the firing sequence for two seismic sources operating in a linear pattern of 400 ft., as described for FIGURE 4, with (A) zero lead-lag; normal recording, (B) 0 to 4½ ms. lead, 0 to 4½ ms. lag; equivalent to a tilt of 8°, (C) 0 to 9 ms. lead, 0 to 9 ms. lag; equivalent to a tilt of 15½° and (D) 0 to 18 ms. lead, 0 to 18 ms. lag; equivalent to a tilt of 33°.

Figure 5:
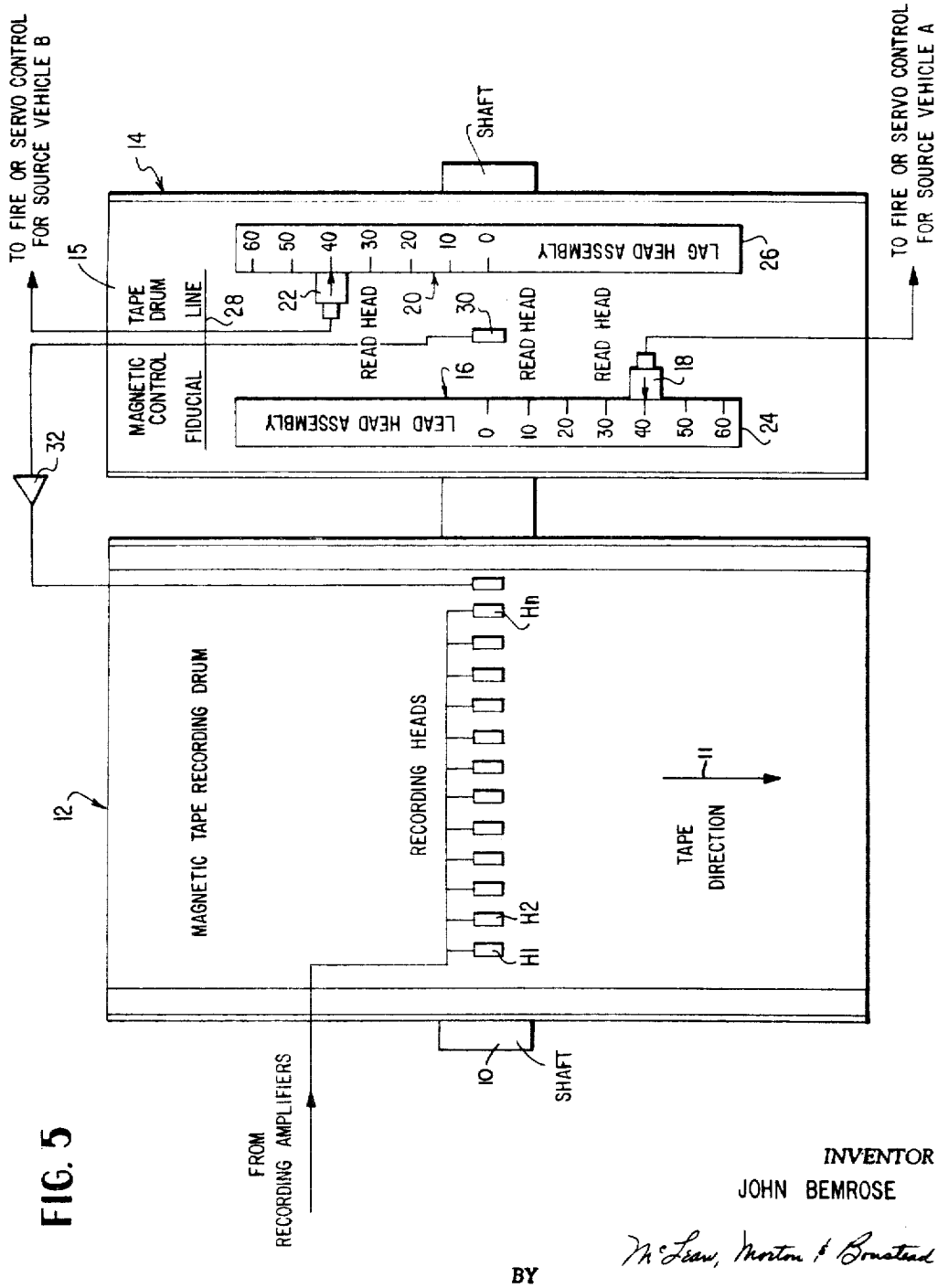
FIGURES 5 and 6 are schematic displays of magnetic recording apparatus for use with the present invention.

FIGURE 5 illustrates a system including two magnetic tape recording drums mounted on the same shaft 10 for controlling the fire of the source, or sources, and for recording reflected events in accordance with this invention. The magnetic tape recording drum 12 which is mounted on the left includes a plurality of recording heads H1, H2, . . . H$n$ which permit the outputs of the several transducers, e.g., $R_1$ to $R_2$, after amplification and conventional filtering, to be recorded as separate channels of seismic wave energy. The magnetic tape control drum 14 which is mounted on the right is the fire control drum and forms the principal part of this invention is as much as to permit the sources, vehicles A and B, to be fired, or otherwise to inject, impulsive or continuous seismic signals into the ground. The drum 14 is covered by a magnetic surface 15; e.g., tape or, preferably, by magnetic oxide material so that the surface is continuous. Two separate magnetic read assemblies 16 and 20 including, respectively, read heads 18 and 22, are mounted over the surface 15 so that the heads 18 and 22 can be moved forward or backward along the periphery of the drum 14 in the same and opposite directions of the drum movement, see the arrow 11. Scales 24 and 26 calibrated in relation to the drum size and speed of rotation to read in milliseconds are provided, respectively, for the heads 18 and 22. To fire the energy source a fiducial line of magnetization 28 is made across the drum on the magnetic surface 15 parallel to the axis of the drum 14, i.e., shaft 10. Line 28 is read by the heads 18 and 22 separately and, after amplification, the pulses so derived are transmitted by radio (not shown) separately to each of the two sources, vehicles A and B, and cause them to fire and so inject two impulsive forces into the ground. When the two heads 18 and 22 are moved along their calibrated scales 24 and 26 so that they are both at the zero line of their movement then the fiducial line 28 will be read simultaneously by both heads as the drum rotates and both sources will therefore fire at the same moment. When the head 18 is moved in the same direction to the movement of the drum by a calibrated amount $\Delta T$, the reflection time is lengthened by this amount, and similarly, when the head 22 is moved in the opposite direction to the movement of the drum by a calibrated amount $\Delta T$, the reflection time is shortened by this same amount. The passage of the fiducial mark 28 under head 30 mounted at the time origin of the system generates an impulse which, after amplification at 32, is recorded on the record drum 12 to provide an origin of time for all the record tapes.

Thus, two vehicle sources, A and B use the pattern of source locations in FIGURE 4 for up-dip shooting by first locating the vehicles at opposite ends of the diagonal of the shooting pattern parallel to the shooting direction, vehicle A at the end nearest the recording transducers and vehicle B at the end furthest away from the recording transducers. Read head 18 is set for 16 milliseconds of lead and read head 22 is set for 16 milliseconds of lag so that the fiducial mark 28 causes vehicle B to fire first and vehicle A to fire 32 milliseconds later. After these recordings have been made each source proceeds to the next line towards the center of the pattern, see FIGURE 4, where vehicle A occupies three separate locations with a lead firing time of 14 milliseconds for each location and vehicle B occupies three corresponding locations with a lag firing time of 14 milliseconds. After these recordings have been made the vehicles proceed to the next nearest line towards the center for five separate and corresponding locations on each line and lead and lag times of 13 milliseconds, and so on, in this manner for the remainder of the pattern. In this way all the reflection events from the reflector in question for all the source locations are brought into the same phase, so that, by summing these channels of information the reflection events are augmented in amplitude with respect to the background noise.

It will be immediately apparent that, by keeping the read heads 18 and 22 on the zero marks of the lead-lag scales 24 and 26 so that the two sources are fired simultaneously, the reflection signals can be maintained in the same phase by moving all the recording heads recording the signal arrivals at the surface transducers $R_1$ and $R_2$ by the same appropriate amounts the read heads 18 and 22 were moved provided the two sources are always on the same line of the source pattern at right angles to the profile direction at the moment of firing. The amount of movement of the recording head assembly required in the same or opposite direction of the tape movement depends on which line of the source pattern the source vehicles are located. Moving the recording heads assembly in the direction opposite to the tape movement increases the reflection time (leads) while movements in the same direction as the tape movement decreases the reflection time (lags). For source locations on the left half of the pattern of FIGURE 4, the recording head assembly is therefore made to lead by the values in milliseconds shown in FIGURE 4. For each of the lines of the source locations on the right the record head assembly is made to lag by the same corresponding amount, the two sources always being fired from locations on the same line, in order to obtain the results described above with movement of the read heads 18 and 22.

Figure 6:
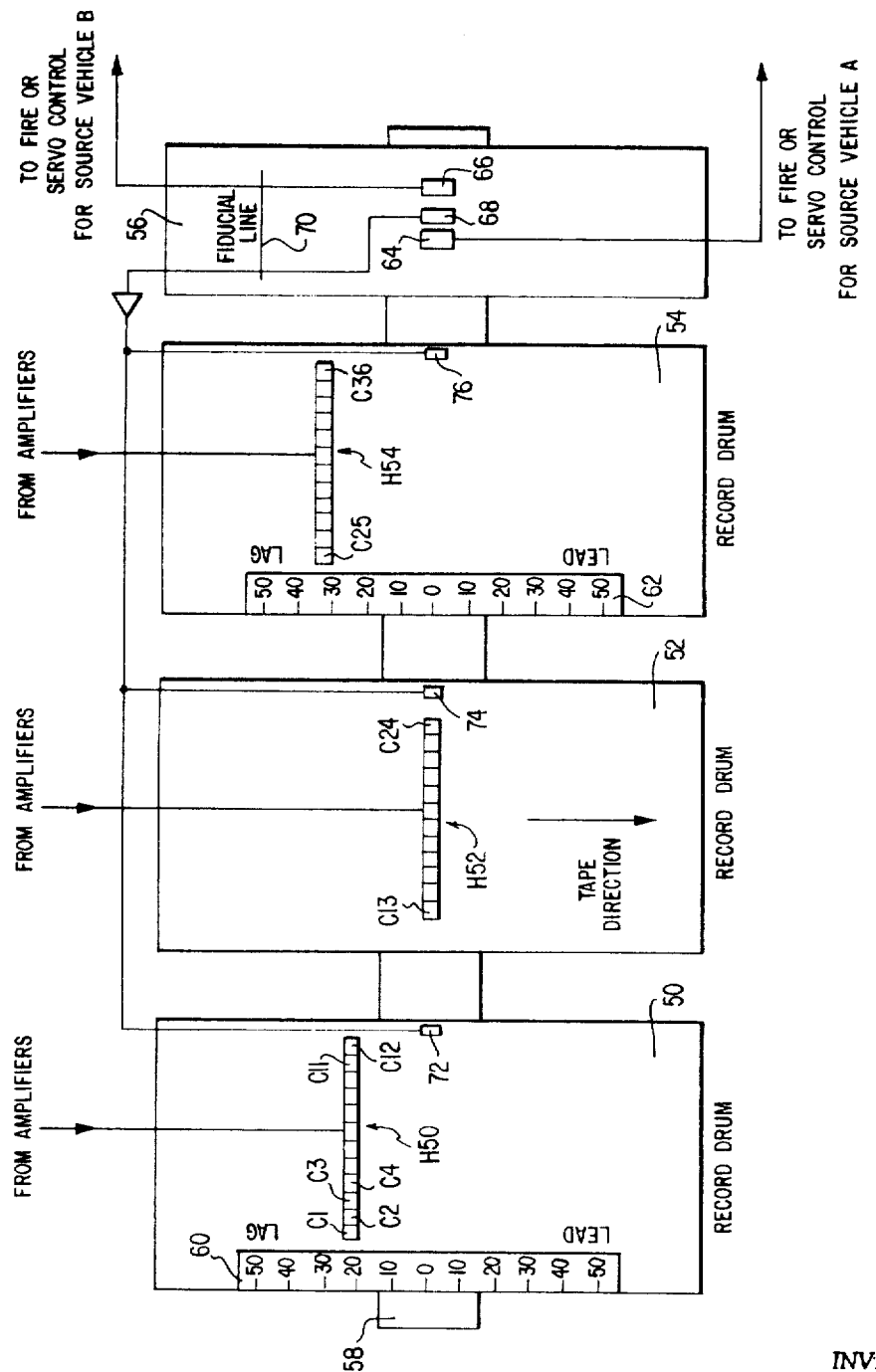

FIGURE 6 schematically illustrates a system adapted for performing this alternative procedure which includes three drums, 50, 52 and 54, and a fire control drum 56, monuted on the same shaft 58. A plurality of recording heads H50, H52, and H54 on the recording drum 50, 52 and 54, respectively, each include a plurality of channels, i.e., channels C1 through C12 for recording heads H50, channels C13 through C24 for recording heads H52, and channels C25 through C36 for recording head H54. Signals from the transducers $R_1$ to $R_2$ after amplication and filtering as a divided output of the amplifiers are applied to the individual channels and are recorded equally by the recording head assemblies H50, H52 and H54. Channel 1 of head assembly H50 records the same wave train as channel C13 of head assembly H52 and channel 25 of head assembly H54, and so on for the remaining channels. However, the recording head assemblies H50 and H54 are movable in the same and opposite directions of the drum movement against time scales 60 and 62, respectively, calibrated in milliseconds in the same way as were the firing heads in FIGURE 5. The firing read heads 64 and 66 are opposite one another in line with head 68 so that the magnetic fiducial line 70 passes them at the same moment and so causes the two vehicular sources to be fired simultaneously. The read head 68 transmits, as in FIGURE 5, the time origin of the system to each of the three recording heads 72, 74 and 76 on, respectively, drums 50, 52 and 54.

Figure 7:
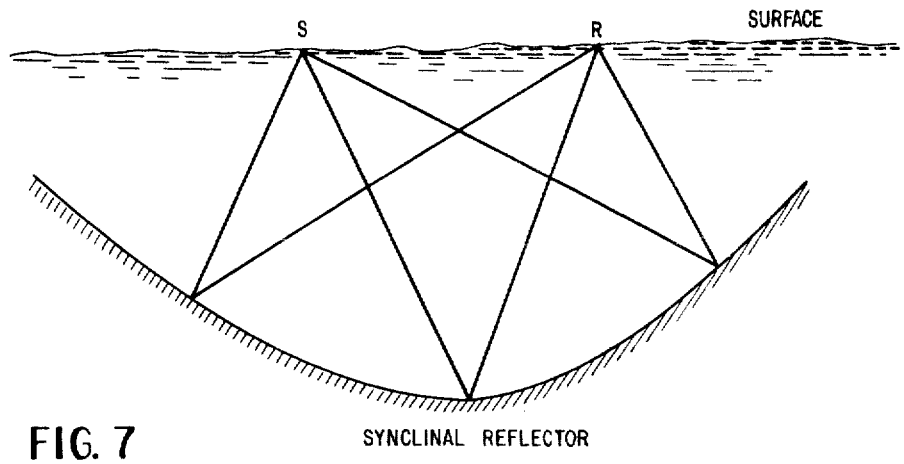
FIGURE 7 illustrates a synclinal reflector which produces reflection events from three separate depths.

Since the time variation over the transducer spread $R_1$ to $R_2$ depends on the angle of dip of the reflector and also on the reflection time the variation becoming almost negligible for large reflection times, multiple recording with three drums will permit shallow, deep and very deep reflection horizons to be mapped for the same field effort by operating a lead-lag program of the recording head assembly for shallow reflections with drum 50, a second lead-lag program of the recording head assembly for deeper reflections with drum 54 and a fixed recording head assembly position or conventional operation for drum 52 for recording very deep reflection events. Thus, for the same field effort and in the same time requirement for a conventional operation the multiple drum apparatus of this invention permits in-phase compositing of the reflection events from three separate depths; the very deep and two shallow depths where the angles of dip may be different but in the same direction or for two reflection horizons where the angles of dip are in opposite directions as in the case of the two sides of a synclinal fold such as illustrated in FIGURE 7. An advantage of this alternate method of recording is in transformed seismic recording where source and receiver are interchanged. An array of receiving transducers constituting a single channel is maintained in a fixed position and successive channels of recording are made by moving the energy sources from a source location pattern in one position to a similar source location pattern in another position and so on, the recordings for each location pattern being summed into separate channels of recording, using a two source linear pattern.

Although the foregoing description has been with reference to impulsive sources, the principle of this invention applies equally well to sources injecting continuous monochromatic sound waves into the ground where the reflection arrivals are determined by methods such as described in copending application Serial No. 455,184, filed May 12, 1965, by John Bemrose, now U.S. Patent No. 3,363,230 issued Jan. 9, 1968. However, in the case of continuous monochromatic sound wave trains, additional advantageous directional effects can be achieved as a means to enhance further the phase compositing of signals reflected from inclined reflectors. A series of monochromatic sound sources operated simultaneously in the same phase can produce a narrow beam of energy directed vertically downwards and by changing the relative phases of the sources, this beam can be directed away from the vertical into an optimum direction most suited to efficient propagation of reflected energy. These desired effects are achieved by operating the several sources simultaneously, although it is possible to obtain similar effects by the operation of only one source, the operation being a sequential one from each of the same source locations and where the individual recordings from each of the source locations are summed. The efficiency of the operation is however, increased by the use of two or more similar sources. Also, by the principle of reciprocity, an array of linearly spaced receiving transducers can, by the introduction of additional relative phase difference between the individual transducers, have its direction of maximum sensitivity to reception turned from the vertical direction into an optimum direction most suited to the reception of reflected energy.

Figure 8:
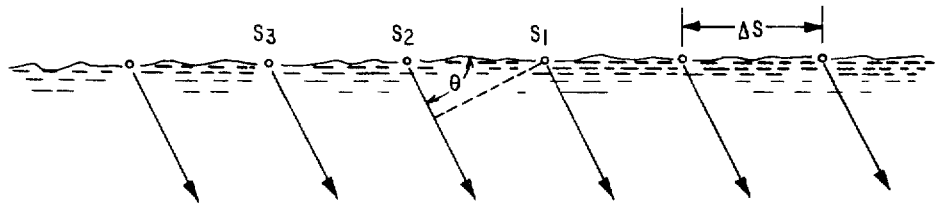

Consider, as in FIGURE 8, the linear array of $(m)$ similar sources, $S_1$, $S_2$, $S_3$, ... $S_m$, equi-spaced on the ground surface at an interval $\Delta S$ injecting continuous compressional waves of constant amplitude and constant angular frequency $(\omega)$ and suppose the resultant maximum amplitude of wave displacement at a distant point (P) below the ground surface oriented at an angle $(\phi)$ to the line of sources in the vertical plane is unity. If each of the $(m)$ sources transmits a wave of amplitude $1/m$ and all the sources are operating in the same phase the contribution to the resultant amplitude at the point P by any source $S_1$ is $1/m \cos \omega t$, and contribution by the next adjacent source $S_2$ to the left of the source $S_1$ is $1/m \cos (\omega t + \beta)$. The angle $(\beta)$ is the phase difference due to the difference in location of the sources, and it is evident from FIGURE 8 that if $(\lambda)$ is the wave length of the injected waves, $$\beta = 2\pi \frac{\Delta S}{\lambda} \cos \varphi \qquad (4)$$

For the next source location $S_3$ to the left of $S_2$ the phase difference between the locations $S_1$ and $S_3$ is $2\beta$ so that for $(m)$ sources in line spaced $\Delta S$ apart the resultant amplitude R at the distant point P is given by, $$R = \frac{1}{m} \sum_{K=0}^{M-1} \cos (\omega t + K\beta) \qquad (5)$$

or $$R = 1/m \cos \omega t + 1/m \cos (\omega t + \beta) + 1/m \cos (\omega t + 2\beta) + \ldots \text{[to } (m-1) \text{ terms]} \qquad (6)$$

from which it may be shown that $$R = \frac{1}{m} \frac{\sin \frac{m\beta}{2}}{\sin (\beta/2)} \cos [\omega t + (m-1)\beta/2] \qquad (7)$$

Figure 9:
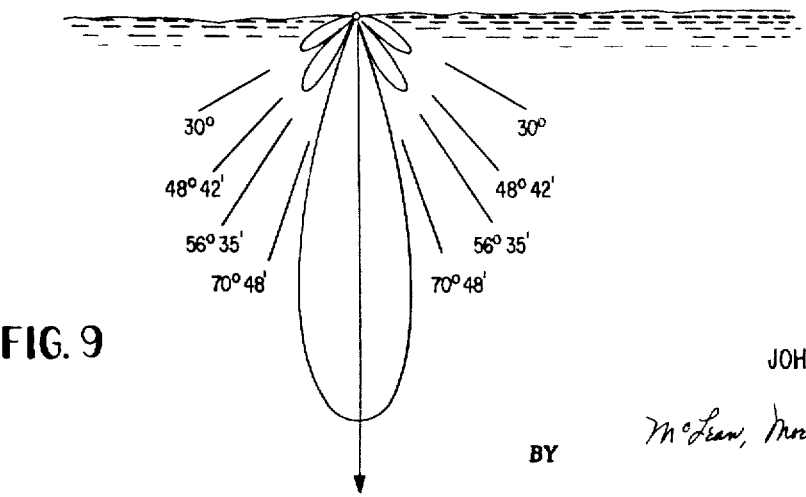

Thus, the resultant displacement at P is sinusoidal of the same frequency as the injected wave train. The amplitude $A_m$ is, $$A_m = \frac{1}{m} \frac{\sin \frac{m\beta}{2}}{\sin (\beta/2)} \qquad (8)$$

and the variation in the maximum amplitude with $\phi$ for the $(m)$ sources is identical in form to that of a uniformly illuminated antenna of uniformly spaced elements. The amplitude $A_n$ is a maximum when $\beta=0$, or $\phi=\pi/2$, and the distribution of maximum amplitudes in the range $\phi=0$ to $\phi=\pi$ is shown in FIGURE 9 for the case where $m=6$ and $\Delta S=\lambda/2$. The distribution will have the same form for the case where $M\Delta S=3\lambda$, where ($m$) can now be large and $\Delta S$ small. Thus ($m$) sources operated simultaneously in the same phase produces an energy distribution which is directional, the direction of maximum energy being vertically downwards from the center of the linear array of sources. The primary maximum lobe becomes more elongated and therefore more directional as ($m$) is increased. When the ($m$) sources are operated simultaneously with an additional relative phase difference $\omega\Delta T$ radians between the successive sources as shown in FIGURE 10, the new relative phase difference is now $$\beta = \frac{2\pi\Delta S}{\lambda} \cos\varphi + \omega\Delta T \quad (9)$$

from which $A_m$ is a maximum when $\beta=0$ or where, $$\cos\varphi = -\omega\Delta T \frac{\lambda}{2\pi\Delta S}$$

and since, $\omega\lambda = 2\pi V$ where V is the compressional wave velocity in the medium, $$\cos\varphi = -\frac{V\Delta T}{\Delta S}$$

Let $\phi = \pi/2 + \theta$ so that $$\sin\theta = \frac{V\Delta T}{\Delta S} \quad (10)$$

The direction of maximum amplitude variation is now rotated from the vertically downward direction, FIGURE 9, to a direction inclined to the left at an angle $\theta$ to the vertical as shown in FIGURES 11 and 12. For a particular velocity (V) and source space intervals $\Delta S$ this direction can be chosen at will by suitably choosing the time interval $\Delta T$ and making the relative phase $\omega\Delta T$ progressive to the left or to the right as required for optimum reception of reflected energy by a transducer R.

In the practical use of continuous sources of monochromatic compressional waves in accordance with this invention, these results are achieved by the use of a single source by recording the output of this source sequentially from each of the several source locations in the linear array. This output received at the transducer R is recorded on separate channels of magnetic tape from each of the ($m$) source locations, the source vehicle moving sequentially from one source location to the next. After the ($m$) recordings have been made the channels of recordings are added together to form a single channel of recording. This operation of summing to achieve the desired result is valid because the directive properties of the source location pattern stem from Equation 5, which is a summation of the wave placements from the several locations. In the same way, a single source can be used sequentially to obtain directivity of the wave energy in the plane of the source array other than the vertical direction by operating the source at each source location sequentially with an additional constant phase difference which can be chosen. It is apparent that two or more sources can be used, if desired, at different locations in the source pattern provided that each one operates with the appropriate difference in phase commensurate with its location. The foregoing description of the use of a single source or several sources to attain directivity of the downward propagating energy also applies to a linear array of equi-spaced receiving transducers, the linear array having a directional sensitivity to the reception of the energy. If there are ($m$) transducers spaced apart the same distance as the source locations, the directional sensitivity pattern will be the same as that in FIGURE 9, provided the receivers are all equally effective. A receiving array is most effective when the size of the array is several times the wave length of the propagation which can be a disadvantage if several large arrays of receivers have to be set out on the ground. However, in the transformed method of seismic recording the source and receivers are interchanged so that a single receiving array is used to record energy from several source patterns in turn, it being much easier and more economical to move the sources than to move large arrays. Thus, in the transformed method of the recording monochromatic wave trains, a system such as shown in FIGURE 13, would be used to control two vehicular sources, A and B, each capable of injecting continuous monochromatic signals into the ground under a program control by the aid of radio transmitted signals.

The system of FIGURE 13 includes a magnetic tape recording drum 100 and a magnetic tape control drum 102. Two read heads 104 and 106 read two copies 108 and 108' of a continuous monochromatic signal of a desired frequency previously recorded on the magnetic surface of drum 102 in exactly the same phase so that one signal train 108 enslaves the vibrations of source vehicle A and the second signal 108' train enslaves in an essentially similar manner the vibrations of source vehicle B. The heads 104 and 106 can be moved in the same and opposite directions as the movement of drum 102 so that the first moment of injection of the wave trains can be made to lag or lead with reference to a time origin by amounts calibrated in milliseconds, the movements of the head 104 providing leads and the movements of the head 106 providing lags. In this way the moment of injection of the wave trains by the two sources can be controlled depending upon their positiotn in the linear source array so as to maintain any desired constant relative phase between the successive source locations and so direct the principal maximum lobe of the source radiation pattern in the optimum direction as described above. The passage of the continuous monochrommatic signal 108'', which is identical to signals 108 and 108', under head 114 mounted at the time origin of the system generates an impulse which, after amplification at 116, is recorded by head 120 on the record drum 100 to provide an origin of time for all record tapes. In FIGURE 13, magnetic recording drum 100, mounted on the same shaft 110 as drum 102, has an assembly 112 of recording heads for recording the output of a plurality, i.e., 24 of separately recording transducers after amplification into separate channels of recording by means of the twenty-four individual recording heads H101 to H124. Recording heads H101 to H124 are movable forward and backward in the tape direction by amounts calibrated in milliseconds. As illustrated, the recording heads H101 to H124 have been moved and oriented into a straight line inclined to the axis of the drum at an angle ($\theta$) with recording head H124 moved in the same direction as the magnetic tape movement and recording head H101 moved an equal amount in a direction opposite to the tape movement. Thus, reflection energy arriving at transducer represented by H101 is advanced in time while that arriving at transducer represented by H124 is retarded in time. FIGURE 14 displays a linear array of individual transducers numbered T101 to T124 equispaced a distance $\Delta R$ apart on the ground surface, the energy from each numbered transducer being fed, after amplification, to the respective recording head H101 to H124, see FIGURE 13. Reflection energy arriving from below with a trajectory in the vertical plane containing the linear array which are inclined at ($\theta$) to the left of the vertical through the center of the array will arrive first at the transducer T124 and last at transducer T101. When, however, the recording heads H101 to H124 are oriented as in FIGURE 13, in the same angle ($\theta$) to the axis of the drum 100, the reflection energy will arrive in the same phase on each of the 24 channels, so that when these channels are summed into a single channel by means of a wide magnetic head 126, the amplitude of the reflection signals will be greatly augmented and because the summation procedure is identical to the summation procedure of Equation 5, the receiving array can be designed in terms of the wave length to have directional sensitivity in the same direction ($\theta$) to the vertical. The movement of the recording heads to permit this in-phase compositing coupled with the directional sensitivity of the array is a further exploitation of the art of seismic recording in addition to the directional properties possessed by a linear array of sources.

The directional properties of a linear array of sources where the locations are occupied sequentially by one or two mobile sources and where the desired direction of maximum energy propagation is achieved by means of a lead-lag control on a rotating drum can be exploited together with the direction sensitivity of a linear array of receiving transducers, the direction of maximum sensitivity to reception being achieved by movable recording heads mounted on a similar magnetic tape recording drum of the same size on the same shaft as the lead-lag control drum.

I claim:

1. In a method of seismic reflection surveying utilizing ground surface coupled energy sources where the energy level, the wave form of the injected waves, and the moment of injection of each wave with respect to a fixed time origin is repeatable, comprising injecting into the ground a plurality of separate impulsive compressional waves from at least one of said energy sources and separately recording the energy of said waves originating from said source after reflection from a reflection horizon of interest, the improvement of a method for in-phase compositing of the desired reflection signals while at the same time attenuating undesired interfering signals by essentially out-of-phase compositing comprising injecting at least some of said waves at a determined time leading in time with respect to said fixed time origin, injecting at least some of said waves at a determined time lagging in time with respect to said fixed time origin, separately recording the energy of said separate waves originating from the source reflected from a reflection horizon to produce separate records having the eflected energy essentially in-phase for all the source locations in a given source pattern and having surface waves essentially out-of-phase, said determined lead and lag times not affecting this essentially out-of-phase condition of the surface waves generated at each of the source locations, and summing the several recordings of the reflection signals essentially in-phase to augment the reflection signals in amplitude while the surface waves being essentially out-of-phase are attenuated, said determined lead and lag times being functions of distance between source locations, depth of reflection horizon and velocity and the attitude of the reflector horizon of geologic interest.

2. A method as defined in claim 1 wherein said source is controlled to create said separate waves by separate injection signals by a magnetic fiducial mark on a rotating drum by the steps of reading said fiducial mark by two read heads mounted on a control drum in a manner that permits the heads to be moved in the same and opposite directions with respect to the drum rotation by calibrated amounts, applying the read fiducial marks to said source, recording the reflected energy of said separate waves on magnetic tape mounted on a drum having the same dimensions as and mounted on the same shaft as said control drum, and summing the separate records on said magnetic tape corresponding to the desired reflection signals, said reflection signals being essentially in-phase to augment the reflection signals in amplitude while the surface waves being essentially out-of-phase are attenuated.

References Cited

UNITED STATES PATENTS

| 2,767,389 | 10/1956 | McCollum | 181—.5 XR |
| 3,022,851 | 2/1962 | Hasbrook | 181—.5 |
| 3,022,852 | 2/1962 | Pavey | 181—.5 |
| 3,268,028 | 8/1966 | Miller | 181—.5 |
| 3,283,295 | 11/1966 | Montgomery | 181—.5 X |

SAMUEL FEINBERG, *Primary Examiner.*